United States Patent
Hu

(10) Patent No.: US 9,807,230 B2
(45) Date of Patent: Oct. 31, 2017

(54) PARAMETER WRITING PROGRAM ON COMMUNICATION SUBSCRIBER CARD

(71) Applicant: Intel Corporation, Santa Clara, CA (US)

(72) Inventor: Jun Hu, Hangzhou (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/195,461

(22) Filed: Jun. 28, 2016

(65) Prior Publication Data
US 2017/0006153 A1    Jan. 5, 2017

(30) Foreign Application Priority Data

Jul. 2, 2015    (CN) .......................... 2015 1 0382385

(51) Int. Cl.
*H04M 3/22*    (2006.01)
*H04W 24/02*    (2009.01)
*H04W 24/06*    (2009.01)

(52) U.S. Cl.
CPC ............ *H04M 3/22* (2013.01); *H04W 24/02* (2013.01); *H04W 24/06* (2013.01)

(58) Field of Classification Search
CPC ..... H04W 24/00; H04W 24/02; H04W 24/06; H04M 3/22
See application file for complete search history.

(56) References Cited

U.S. PATENT DOCUMENTS

2011/0164511 A1*  7/2011  Poon ................... H04L 43/0811
                                                      370/252

FOREIGN PATENT DOCUMENTS

CN            104113853 A      10/2014

OTHER PUBLICATIONS

Office Action dated May 2, 2017 for Chinese Patent Application No. 201510382385.7.

* cited by examiner

*Primary Examiner* — Blane Jackson
(74) *Attorney, Agent, or Firm* — Schiff Hardin LLP

(57) ABSTRACT

The present invention provides a mobile apparatus and a communication subscriber card testing method. The mobile apparatus comprises a communication subscriber card port apparatus and a controller. The communication subscriber card port apparatus is used to be connected to a communication subscriber card. The controller is used to transmit an administrative check instruction to the communication subscriber card via a card operation interface and encode at least a parameter into at least a first encoded parameter conforming to a first specific format of the communication subscriber card after the controller receives a check success message from the communication subscriber card via the card operation interface, so as to execute a parameter writing program on the communication subscriber card and write the first encoded parameter into the communication subscriber card.

14 Claims, 9 Drawing Sheets

PARAMETER WRITING PROGRAM ON COMMUNICATION SUBSCRIBER CARD

TECHNICAL FIELD

The present invention relates to a communication subscriber card testing apparatus, and particularly to a communication subscriber card testing apparatus that can directly modify a parameter on a mobile apparatus.

BACKGROUND ART

In recent years, as the wireless communications industry is flourishing, various wireless communications devices are becoming cheaper and cheaper, thus enabling more and more people to use various wireless communications devices, one example of which are mobile phones we commonly use. Moreover, with the advance of various electronic and industrial technologies, it has become a common trend that various electronic communication devices tend to be developed to be light, thin, short and small, and the planning of functionality and use thereof is further improved to meet the demands of mass customers. As a result, mobile phones of small size and easy to carry have become vital and common communication tools for individuals. The increasingly popular application of mobile phones become necessarily enables operation of communication lines to enjoy business opportunities of high profits.

However, when a communication subscriber card provided by a communication line operation institution is tested, the communication subscriber card needs to be removed from a mobile apparatus and inserted into a card reader external to the mobile apparatus, and only in this way can the communication subscriber card be tested. Therefore, it causes inconveniences to a developer, and problems cannot be solved immediately. In some cases, problems of a communication subscriber card may occur casually, and if the problems cannot be solved on the mobile apparatus immediately, the problems will disappear when the communication subscriber card is removed and thus developers and testers cannot debug the communication subscriber card with respect to the problems.

SUMMARY OF THE INVENTION

The mobile apparatus of the present invention may directly read and write a testing parameter in a communication subscriber card so as to reduce the inconveniences for testers and developers and can immediately test problems occurring to the mobile apparatus.

The present invention provides a mobile apparatus. The mobile apparatus comprises a communication subscriber card port apparatus and a controller. The communication subscriber card port apparatus is used to be connected to a communication subscriber card. The controller is used to transmit an administrative check instruction to the communication subscriber card via a card operation interface and encode at least a parameter into at least a first encoded parameter conforming to a first specific format of the communication subscriber card after the controller receives a check success message from the communication subscriber card via the card operation interface, so as to execute a parameter writing program on the communication subscriber card and write the first encoded parameter into the communication subscriber card.

In an embodiment, the parameter is a parameter that needs to be updated for testing the communication subscriber card, and the first specific format is hexadecimal.

In an embodiment, in the parameter writing program, the controller transmits a dedicated file selection signal to the communication subscriber card via the card operation interface; the controller transmits an elementary file selection signal to the communication subscriber card via the card operation interface when receiving a selection dedicated file executed signal from the communication subscriber card via the card operation interface; the controller transmits an instruction to read an elementary file to the communication subscriber card via the card operation interface when the controller receives a selection elementary file executed signal from the communication subscriber card via the card operation interface, to receive elementary file data from the communication subscriber card; the controller then transmits the first encoded parameter and a writing instruction to the communication subscriber card via the card operation interface when the controller receives the elementary file from the communication subscriber card via the card operation interface, so as to write the first encoded parameter into the communication subscriber card.

In addition, the mobile apparatus further comprises a display apparatus, wherein when the controller receives a writing result message corresponding to the parameter writing program from the communication subscriber card via the card operation interface, the controller causes the display apparatus to display the writing result message.

In yet another embodiment, the controller is further used to receive an original administrative check instruction from a host and convert the original administrative check instruction into the administrative check instruction via a debugging interface so as to transmit the administrative check instruction to the communication subscriber card via the card operation interface. After the controller receives the check success message from the communication subscriber card via the card operation interface, the controller is further used to encode the check success message into an encoded check success message conforming to a second specific format via the debugging interface and transmit the encoded check success message to the host. When receiving an original writing instruction and a parameter from the host, the controller converts the original writing instruction into the dedicated file selection signal, the elementary file selection signal and the writing instruction via the debugging interface. When the controller receives the writing result message corresponding to the parameter writing program from the communication subscriber card via the card operation interface, the controller converts the writing result message into an encoded writing result message conforming to the second specific format via the debugging interface so as to transmit the encoded writing result message to the host. In an embodiment, the second specific format conforms to an ETS specification.

The present invention also provides a communication subscriber card testing method applied to a mobile apparatus connected to a communication subscriber card. The communication subscriber card testing method comprises: transmitting an administrative check instruction to the communication subscriber card via a card operation interface of the mobile apparatus; encoding at least a parameter into at least a first encoded parameter conforming to a first specific format of the communication subscriber card after receiving a check success message from the communication subscriber card via the card operation interface; and performing a parameter writing program on the communication subscriber card and writing the first encoded parameter into the communication subscriber card.

In an embodiment, the parameter writing program further comprises: transmitting a dedicated file selection signal (Dedicated File) to the communication subscriber card via the card operation interface; transmitting an elementary file selection signal (Elementary File) to the communication subscriber card via the card operation interface when receiving a selection dedicated file executed signal from the communication subscriber card via the card operation interface; transmitting an instruction to read an elementary file to the communication subscriber card via the card operation interface when receiving a selection elementary file executed signal from the communication subscriber card via the card operation interface, so as to receive elementary file data from the communication subscriber card; and transmitting the first encoded parameter and a writing instruction to the communication subscriber card via the card operation interface when receiving the elementary file from the communication subscriber card via the card operation interface, so as to write the first encoded parameter into the communication subscriber card.

In another embodiment, the communication subscriber card testing method further comprises: when receiving a writing result message corresponding to the parameter writing program from the communication subscriber card via the card operation interface, causing the display apparatus to display the writing result message.

In yet another embodiment, the communication subscriber card testing method further comprises: receiving an original administrative check instruction from a host; converting the original administrative check instruction into the administrative check instruction via a debugging interface so as to transmit the administrative check instruction to the communication subscriber card via the card operation interface; encoding the check success message into an encoded check success message conforming to a second specific format via the debugging interface after receiving the check success message from the communication subscriber card via the card operation interface; transmitting the encoded check success message to the host; converting an original writing instruction into the dedicated file selection signal, the elementary file selection signal and the writing instruction via the debugging interface when receiving the original writing instruction and the parameter from the host; and when receiving the writing result message corresponding to the parameter writing program from the communication subscriber card via the card operation interface, converting the writing result message into an encoded writing result message conforming to the second specific format via the debugging interface so as to transmit the encoded writing result message to the host.

DETAILED DESCRIPTION

The apparatus and method of use of various embodiments of the present invention will be described in details below. However, it should be noted that many feasible invention conceptions provided by the present invention can be implemented in various specific scopes. These specific embodiments are only for illustrating the apparatus method of use in the present invention, but not for limiting the scope of the present invention.

Figure 1:
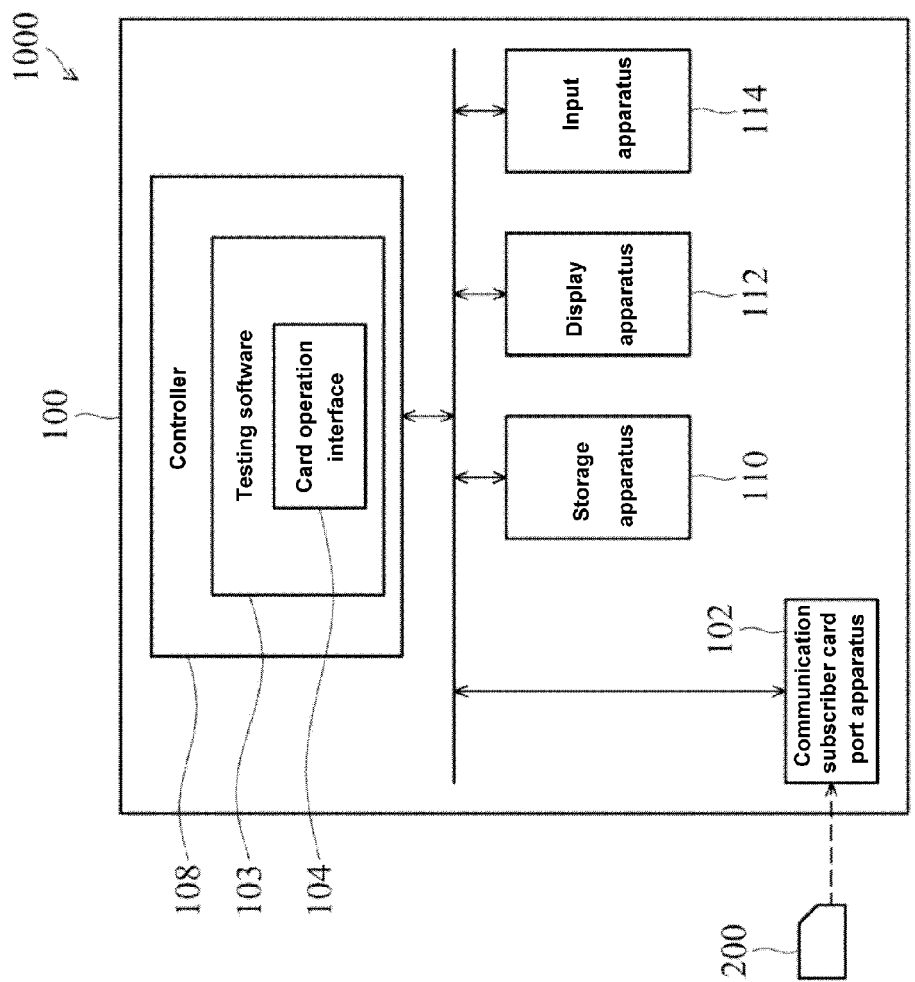
FIG. 1 is a block diagram of one embodiment of a communication subscriber card testing apparatus of the present invention.

FIG. 1 is a block diagram of one embodiment of a communication subscriber card testing apparatus of the present invention. In this embodiment, a communication subscriber card testing apparatus 1000 is namely a mobile apparatus 100. The mobile apparatus 100 may be a tablet computer, a smart phone, a PDA, etc. that has a mobile communication function, and the present invention is not limited in this regard. A person skilled in the art may also implement the mobile apparatus 100 on a computer system configuration, such as hand-held devices, portable devices, a multi-processing unit system, microprocessor-based or programmable consumer electronics, and the like. It should be noted that the mobile communication function may be at least one of LTE (Long Term Evolution), WCDMA (Wideband Code Division Multiple Access), HSUPA (High-Speed Uplink Packet Access), HSDPA (High Speed Downlink Packet Access), GSM (Global System for Mobile Communications) and CDMA (Code Division Multiple Access), and the present invention is not limited in this regard. In this embodiment, a user may directly conduct data update and read to a communication subscriber card 200 via testing software 103 and a card operation interface 104.

The mobile apparatus 100 comprises a communication subscriber card port apparatus 102, a controller 108, a storage apparatus 110, a display apparatus 112 and an input apparatus 114. The communication subscriber card port apparatus 102 is used to be connected to the communication subscriber card 200. In other words, the subscriber card port apparatus 102 has a card slot to accommodate the communication subscriber card 200, so that the mobile apparatus 100 may transmit data with the communication subscriber card 200. In addition, the communication subscriber card 200 may be a communication subscriber card such a SIM (Subscriber Identity Module) card, a UIM (User Identity Model), a CSIM (CDMA Subscriber Identity Module) card, a USIM (UMTS Subscriber Identity Module) card, an NFC (Near Field Communication) card and an LTE (Long Term Evolution) card, etc, and the present invention is not limited in this regard. The controller 108 may comprise a single central-processing unit (CPU) or a plurality of parallel processing units associated with a parallel processing environment. The storage apparatus 110 may include a read only memory (ROM), a flash memory (flash ROM) and/or a random access memory (RAM) for storing a program module executable by the controller 108. It should be noted that in this embodiment, the storage apparatus 110 is further used to store program codes of the testing software 103. It should be noted that in this embodiment, the testing software 103 further comprises a card operation interface 104, wherein the testing software 103 provides a user with an interface to enable the user to write or read a parameter of the communication subscriber card 200 via the card operation interface 104. In other words, the testing software codes 103 and the card operation interface 104 in the testing software 103 are used to be provide to the controller 108 for execution so as to write (update) and read a parameter in the communication subscriber card 200, wherein the parameter is a parameter that needs to be updated for testing the communication subscriber card 200. In other words, the parameter referred to in the present invention is data that cannot be modified by an ordinary end user. The display apparatus 112 is used to display information and an operation interface, for example, an interface of the testing software codes 103. For example, the display apparatus 106 may be an LED display, an LCD display, a flexible display, etc, and the present invention is not limited in this regard. The input apparatus 114 is used to receive an input signal from a user to control the operation interface, for example, the interface of the testing software codes 103. For example, the input apparatus 114 may be a mouse, a key, a touch panel and/or a touch pad, and the present invention is not limited in this regard.

In detail, the controller 108 executes the testing program 103 to receive an instruction input by the user via the input apparatus 114. When the testing program 103 receives the requirements input by the user that correspond to writing or updating at least one parameter, the controller 108 transmits an administrative check instruction to the communication subscriber card 200 via the card operation interface 104. Then, after the controller 108 receives a check success message corresponding to the administrative check instruction via the card operation interface 104 from the communication subscriber card 200, the controller 108 encodes a parameter required to be written or updated by the user into at least a first encoded parameter conforming to a first specific format of the communication subscriber card 200, so as to execute a parameter writing program on the communication subscriber card 200 and write the first encoded parameter in the communication subscriber card 200. It should be noted that the administrative check instruction is an Administrative check instruction (AMD check instruction). The administrative check instruction has one specific segment of instruction codes to provide a verification code of performing parameter writing on the communication subscriber card 200 to a developer (tester), so as to prevent an end user from writing. When the communication subscriber card 200 determines that the administrative check instruction is correct, the communication subscriber card 200 may transmit a check success message back to the controller 108. Otherwise, when the communication subscriber card 200 determines that the administrative check instruction is incorrect, the communication subscriber card 200 may transmit a check failure message back to the controller 108. In one embodiment, the controller 103 may cause the display apparatus 114 to display the check failure message and the check success message. In addition, in one embodiment, the parameter is a parameter that needs to be updated for testing the communication subscriber card 200, and the first specific format is hexadecimal, but the present invention is not limited in this regard. The first specific format may also be other forms that conform to the specification of the communication subscriber card 200.

In the parameter writing program, the controller 108 parses the requirements input by the user and generates a dedicated file selection signal, an elementary file selection signal and a writing instruction. Then, the controller 108 transmits a dedicated file selection signal (Dedicated File) to the communication subscriber card 200 via the card operation interface 104. It should be noted that at least one dedicated file DF (Dedicated File) and at least one elementary file EF (Elementary File) are included in the communication subscriber card 200. The dedicated file has only one file header, in which management and control information for the entire directory is contained. In other words, the dedicated file is equivalent to the root of a directory. The elementary file has not only a file header, but also a file body, wherein the file header contains the location and control information for the file, and the file body contains real data; throughout the entire communication subscriber card 200, only the elementary file has a file body, and only the elementary file is used to contain data. When the communication subscriber card 200 receives the dedicated file selection signal transmitted by the controller 108, the communication subscriber card 200 will select a specific dedicated file according to an index (address) in the dedicated file selection signal and transmit a selection dedicated file executed signal to the controller 108 via the card operation interface 104 after selecting the dedicated file. When the controller 108 receives the selection dedicated file executed signal from the communication subscriber card 200 via the card operation interface 104, the controller 108 transmits an elementary file selection signal (Elementary File) to the communication subscriber card 200 via the card operation interface 104. When the communication subscriber card 200 receives the elementary file selection signal transmitted by the controller 108, the communication subscriber card 200 will select a specific elementary file according to an index (address) in the elementary file selection signal and transmit a selection elementary file executed signal to the controller 108 via the card operation interface 104 after selecting the elementary file. When the controller 108 receives the selection elementary file executed signal from the communication subscriber card 200 via the card operation interface 104, the controller 108 transmits an instruction to read an elementary file to the communication subscriber card 200 via the card operation interface 104 to receive elementary file data from the communication subscriber card 200. When the communication subscriber card 200 receives the instruction to read an elementary file via the card operation interface 104, the communication subscriber card 200 transmits the elementary file data corresponding to the selected dedicated file and elementary file to the controller 108 via the card operation interface 104. When the controller 108 receives the elementary file from the communication subscriber card 200 via the card operation interface 104, the controller 108 then transmits the first encoded parameter and a writing instruction to the communication subscriber card 200 via the card operation interface 104 so as to write the first encoded parameter into the communication subscriber card 200. Finally, after the communication subscriber card 200 successfully writes the first encoded parameter according to the writing instruction, a writing result message corresponding to writing success is transmitted so as to end the parameter writing program. Otherwise, when the communication subscriber card 200 cannot writes the first encoded parameter successfully according to the writing instruction, a writing result message corresponding to writing failure is transmitted so as to end the parameter writing program.

In an embodiment, when the controller 108 receives the writing result message corresponding to the parameter writing program from the communication subscriber card 200 via the card operation interface 104, the controller 108 causes the display apparatus 112 to display the writing result message, but the present invention is not limited in this regard.

When the testing program 103 receives the requirements corresponding to reading a parameter in the communication subscriber card 200 input by a user, the controller 108 may directly execute a parameter reading program.

In the parameter reading program, the controller 108 parses the requirements input by the user and generates a dedicated file selection signal, an elementary file selection signal and a reading instruction. Then, the controller 108 transmits a dedicated file selection signal (Dedicated File) to the communication subscriber card 200 via the card operation interface 104. When the communication subscriber card 200 receives the dedicated file selection signal transmitted by the controller 108, the communication subscriber card 200 will select a specific dedicated file according to an index (address) in the dedicated file selection signal and transmit a selection dedicated file executed signal to the controller 108 via the card operation interface 104 after selecting the dedicated file. When the controller 108 receives the selection dedicated file executed signal from the communication subscriber card 200 via the card operation interface 104, the controller 108 transmits an elementary file selection signal (Elementary File) to the communication subscriber card 200 via the card operation interface 104. When the communication subscriber card 200 receives the elementary file selection signal transmitted by the controller 108, the communication subscriber card 200 will select a specific elementary file according to an index (address) in the elementary file selection signal and transmit a selection elementary file executed signal to the controller 108 via the card operation interface 104 after selecting the elementary file. When the controller 108 receives the selection elementary file executed signal from the communication subscriber card 200 via the card operation interface 104, the controller 108 transmits an elementary file attribute reading signal to the communication subscriber card 200 via the card operation interface 104. When the communication subscriber card 200 receives the elementary file attribute reading signal transmitted by the controller 108, the communication subscriber card 200 transmits elementary file attribute data back to the controller 108, wherein the elementary file attribute may comprise information such as the type and length, etc. of the elementary file. When the controller 108 receives the elementary file attribute data from the communication subscriber card 200 via the card operation interface 104, the controller 108 transmits an instruction to read an elementary file to the communication subscriber card 200 via the card operation interface 104 to receive elementary file data from the communication subscriber card 200. When the communication subscriber card 200 receives the instruction to read an elementary file via the card operation interface 104, the communication subscriber card 200 transmits the elementary file data corresponding to the selected dedicated file and elementary file to the controller 108 via the card operation interface 104 so as to end the parameter reading program.

In an embodiment, when the controller 108 cannot receive the elementary file data from the communication subscriber card 200 via the card operation interface 104, the controller 108 causes the display apparatus 112 to display a reading failure message, but the present invention is not limited in this regard.

Figure 2:
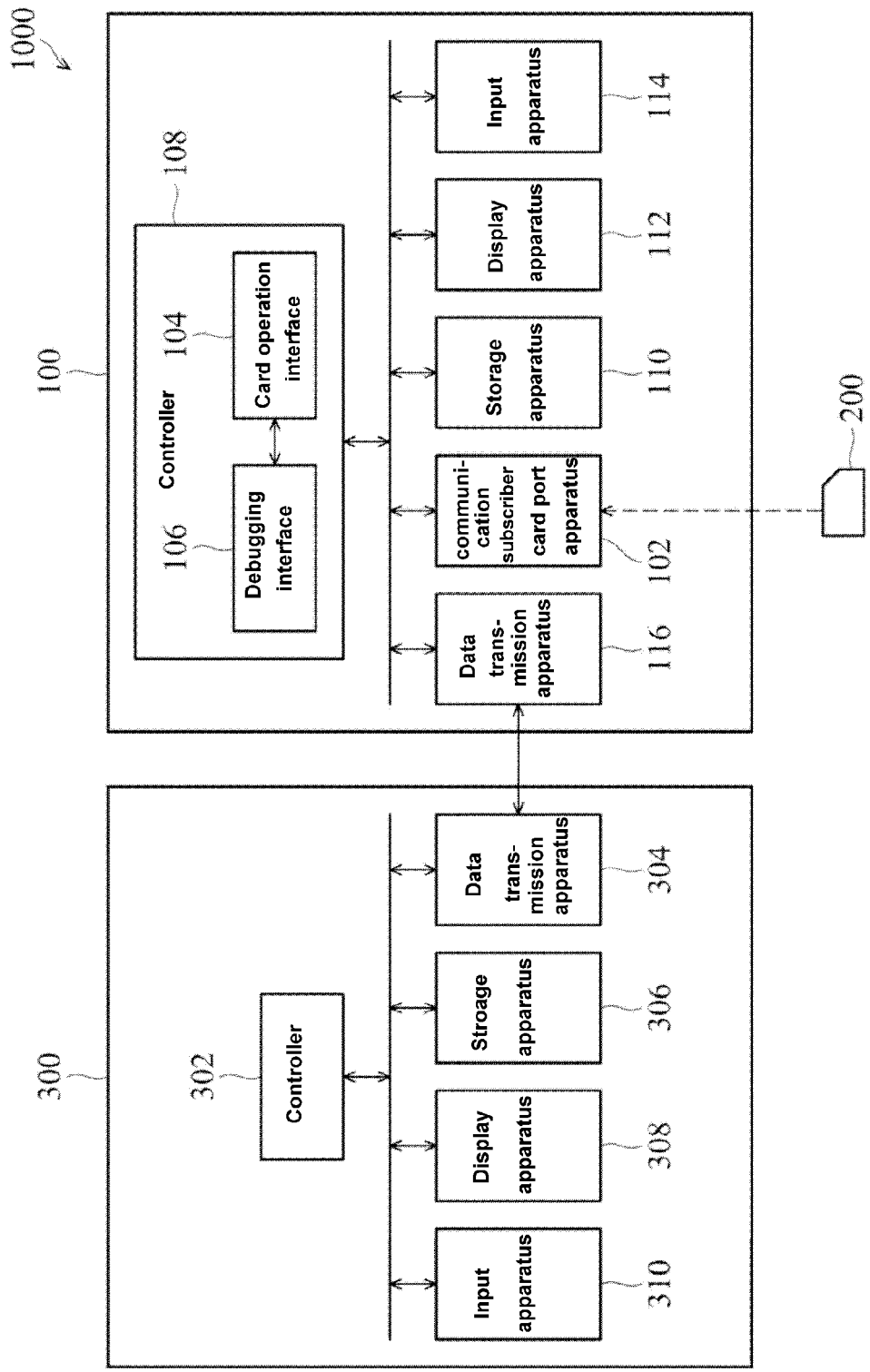
FIG. 2 is a block diagram of another embodiment of a communication subscriber card testing apparatus of the present invention.

FIG. 2 is a block diagram of another embodiment of a communication subscriber card testing apparatus of the present invention. In this embodiment, the communication subscriber card testing apparatus 1000 comprises a mobile apparatus 100 and a host 300. The mobile apparatus 100 is namely the mobile apparatus 100 as shown in FIG. 1. However, in this embodiment, the mobile apparatus 100 further comprises a data transmission apparatus 116. The data transmission apparatus 116 is used to be connected to the host 300 to receive an instruction of the host 300 and cause the controller 108 of the mobile apparatus 100 to perform an operation according to the instruction of the host 300, but the present invention is not limited in this regard. In addition, as the mobile apparatus 100 of this embodiment writes, updates and reads the communication subscriber card 200 via the host 300, the mobile apparatus 100 of this embodiment does not need the testing software 103. However, in this embodiment, the mobile apparatus 100 further comprises a debugging interface 106 to convert an instruction received from the host 300 and transmit the data to the host 300 after the data is converted. In some embodiments, the data transmission apparatus 116 may be an apparatus such as an universal serial bus and Thunderbolt, but the present invention is not limited in this regard. The host 300 comprises a controller 302, a data transmission apparatus 304, a storage apparatus 306, an input apparatus 308 and a display apparatus 310. The host 300 may be a personal desktop computer, a notebook computer, a server, etc. that has a general processing and computing function, and the present invention is not limited herein. A person skilled in the art can also implement the host 300 on a computer system configuration. In this embodiment, a user may operate the mobile apparatus 100 via the host 300 to conduct data write, update and read to a communication subscriber card 200 via the card operation interface 104 and the debugging interface 106 of the mobile apparatus 100. It should be noted that the difference between the embodiment of the communication subscriber card testing apparatus 1000 as shown in FIG. 1 and the communication subscriber card testing apparatus 1000 in FIG. 2 lies in that an operation instruction of the debugging interface 106 of the mobile apparatus 100 is replaced with an internal operation function of the testing software 103 of the mobile apparatus 100 or an AT instruction between a smart phone AP and Modem.

The host 300 comprises a controller 302, a data transmission apparatus 304, a storage apparatus 306, a display apparatus 308 and an input apparatus 310. The controller 302 may comprise a single central-processing unit (CPU) or a plurality of parallel processing units associated with a parallel processing environment. The data transmission apparatus 304 is used to be connected to the data transmission apparatus 116 of the mobile apparatus 100 to transmit an instruction of the host 300 to the mobile apparatus 100 and receive data transmitted back by the mobile apparatus 100, but the present invention is not limited in this regard. For example, the data transmission apparatus 304 may be an apparatus such as a universal serial bus and Thunderbolt, but the present invention is not limited in this regard. The storage apparatus 306 may include a read only memory (ROM), a flash memory (flash ROM) and/or a random access memory (RAM) for storing a program module executable by the controller 302. The display apparatus 308 is used to display information and an operation interface. For example, the display apparatus 308 may be an LED display, an LCD display, a flexible display, etc, but the present invention is not limited in this regard. The input apparatus 310 is used to receive an input signal from a user to control the operation interface. For example, the input apparatus 114 may be a mouse, a key, a touch panel and/or a touch pad, and the present invention is not limited herein.

In detail, a user may generate an original administrative check instruction through an interface provided in the host 300 by receiving an instruction input by the user via the input apparatus 310, and transmit the original administrative check instruction to the mobile apparatus 100 via the data transmission apparatus 304. When the controller 108 of the mobile apparatus 100 receives the original administrative check instruction transmitted by the host 300 via the data transmission apparatus 116, the controller 108 converts the original administrative check instruction into an administrative check instruction via the debugging interface 106 and transmits the same to the communication subscriber card 200 via the card operation interface 104. It should be noted that the administrative check instruction is an Administrative check instruction (AMD check instruction). The administrative check instruction has one specific segment of instruction codes to provide a check code to conduct parameter writing on the communication subscriber card 200 to a developer (tester), so as to prevent an end user from writing. When the communication subscriber card 200 determines that the administrative check instruction is correct, the communication subscriber card 200 will transmit a check success message back to the controller 108 via the card operation interface 104. Then, the controller 108 encodes the check success message into an encoded check success message conforming to a second specific format via the debugging interface 106 and transmits the encoded check success message to the host 300, wherein the second specific format conforms to an ETS specification. Otherwise, when the communication subscriber card 200 determines that the original administrative check instruction is incorrect, the communication subscriber card 200 will transmit a check failure message back to the controller 108. Then, the controller 108 encodes the check success message into an encoded check failure message conforming to a second specific format via the debugging interface 106 and transmits the encoded check failure message to the host 300. Then, after the host 300 receives a check success message corresponding to the administrative check instruction via the data transmission apparatus 304, the controller 302 transmits at least one parameter required to be written or updated by the user and an original writing instruction to the mobile apparatus 100 via the data transmission apparatus 304 so as to cause the mobile apparatus 100 to start a parameter writing program. Then, the controller 108 encodes at least one parameter received from the host 300 into at least one first encoded parameter conforming to a first specific format of the communication subscriber card 200 via the debugging interface 106, so as to execute a parameter writing program on the communication subscriber card 200 and write the first encoded parameter into the communication subscriber card 200. In one embodiment, the controller 302 of the host 300 may cause the display apparatus 308 to display the check failure message and the check success message. In addition, in an embodiment, the parameter is a parameter that needs to be updated for testing the communication subscriber card 200, and the first specific format is hexadecimal, but the present invention is not limited in this regard. The first specific format may also be other forms that conform to the specification of the communication subscriber card 200.

In the parameter writing program, after receiving the original writing instruction and the parameter from the host 100, the controller 108 of the mobile apparatus 100 analyses (converts) the original writing instruction and the parameter via the debugging interface 106 to generate a dedicated file selection signal, an elementary file selection signal and a writing instruction. Then, the controller 108 transmits a dedicated file selection signal (Dedicated File) to the communication subscriber card 200 via the card operation interface 104. It should be noted that at least one dedicated file DF (Dedicated File) and at least one elementary file EF (Elementary File) are included in the communication subscriber card 200. The dedicated file has only one file header, in which management and control information for the entire directory is contained. In other words, the dedicated file is equivalent to the root of a directory. The elementary file has not only a file header, but also a file body, where the file header contains the location and control information for the file, the file body contains real data; throughout the entire communication subscriber card 200, only the elementary file has a file body, and only the elementary file is used to contain data. When the communication subscriber card 200 receives the dedicated file selection signal transmitted by the controller 108, the communication subscriber card 200 will select a specific dedicated file according to an index (address) in the dedicated file selection signal and transmit a selection dedicated file executed signal to the controller 108 via the card operation interface 104 after selecting the dedicated file. When the controller 108 receives the selection dedicated file executed signal from the communication subscriber card 200 via the card operation interface 104, the controller 108 transmits an elementary file selection signal (Elementary File) to the communication subscriber card 200 via the card operation interface 104. When the communication subscriber card 200 receives the elementary file selection signal transmitted by the controller 108, the communication subscriber card 200 will select a specific elementary file according to an index (address) in the elementary file selection signal and transmit a selection elementary file executed signal to the controller 108 via the card operation interface 104 after selecting the elementary file. When the controller 108 receives the selection elementary file executed signal from the communication subscriber card 200 via the card operation interface 104, the controller 108 transmits an instruction to read an elementary file to the communication subscriber card 200 via the card operation interface 104 to receive elementary file data from the communication subscriber card 200. When the communication subscriber card 200 receives the instruction to read an elementary file via the card operation interface 104, the communication subscriber card 200 transmits elementary file data corresponding to the selected dedicated file and elementary file to the controller 108 via the card operation interface 104. When the controller 108 receives the elementary file from the communication subscriber card 200 via the card operation interface 104, the controller 108 then transmits the first encoded parameter and a writing instruction to the communication subscriber card 200 via the card operation interface 104 so as to write the first encoded parameter into the communication subscriber card 200. Finally, after the communication subscriber card 200 successfully writes the first encoded parameter according to the writing instruction, a writing result message corresponding to writing success is transmitted. Otherwise, when the communication subscriber card 200 cannot write the first encoded parameter successfully according to the writing instruction, a writing result message corresponding to writing failure is transmitted. When the controller 108 receives the writing result message corresponding to the parameter writing program from the communication subscriber card 200 via the card operation interface 104, the controller 108 converts the writing result message into an encoded writing result message conforming to the second specific format via the debugging interface 104 so as to transmit the encoded writing result message to the host 300.

In an embodiment, when the controller 108 receives the writing result message corresponding to the parameter writing program from the communication subscriber card 200 via the card operation interface 104, the controller 108 causes the display apparatus 112 to display the writing result message, but the present invention is not limited in this regard.

When the host 300 receives the requirements corresponding to reading a parameter in the communication subscriber card 200 input by a user, the host 300 transmits an instruction to read a file to the mobile apparatus 100 via the data transmission apparatus 304 according to the requirements input by the user. When the controller 108 of the mobile apparatus 100 receives the instruction to read a file from the data transmission apparatus 116, the mobile apparatus 100 can then directly execute a parameter reading program.

In the parameter reading program, the controller 108 converts the received instruction to read a file into a dedicated file selection signal, an elementary file selection signal and a reading instruction via the debugging interface 106. Then, the controller 108 transmits a dedicated file selection signal (Dedicated File) to the communication subscriber card 200 via the card operation interface 104. When the communication subscriber card 200 receives the dedicated file selection signal transmitted by the controller 108, the communication subscriber card 200 will select a specific dedicated file according to an index (address) in the dedicated file selection signal and transmit a selection dedicated file executed signal to the controller 108 via the card operation interface 104 after selecting the dedicated file. When the controller 108 receives the selection dedicated file executed signal from the communication subscriber card 200 via the card operation interface 104, the controller 108 transmits an elementary file selection signal (Elementary File) to the communication subscriber card 200 via the card operation interface 104. When the communication subscriber card 200 receives the elementary file selection signal transmitted by the controller 108, the communication subscriber card 200 will select a specific elementary file according to an index (address) in the elementary file selection signal and transmit a selection elementary file executed signal to the controller 108 via the card operation interface 104 after selecting the elementary file. When the controller 108 receives the selection elementary file executed signal from the communication subscriber card 200 via the card operation interface 104, the controller 108 transmits an elementary file attribute reading signal to the communication subscriber card 200 via the card operation interface 104. When the communication subscriber card 200 receives the elementary file attribute reading signal transmitted by the controller 108, the communication subscriber card 200 transmits the elementary file attribute data back to the controller 108, wherein the elementary file attribute may comprise information such as the type and length, etc. of the elementary file. When the controller 108 receives the elementary file attribute data from the communication subscriber card 200 via the card operation interface 104, the controller 108 transmits an instruction to read an elementary file to the communication subscriber card 200 via the card operation interface 104 to receive elementary file data from the communication subscriber card 200. When the communication subscriber card 200 receives the instruction to read an elementary file via the card operation interface 104, the communication subscriber card 200 transmits the elementary file data corresponding to the selected dedicated file and elementary file to the controller 108 via the card operation interface 104. Then, the controller 108 encodes the elementary file data into encoded elementary file data conforming to the second specific format via the debugging interface 106 and transmits the encoded elementary file data to the host 300 via the data transmission apparatus 116 so as to end the parameter reading program.

In an embodiment, when the controller 302 cannot receive the elementary file data, the controller 302 causes the display apparatus 308 to display a reading failure message, but the present invention is not limited in this regard.

Figure 3:
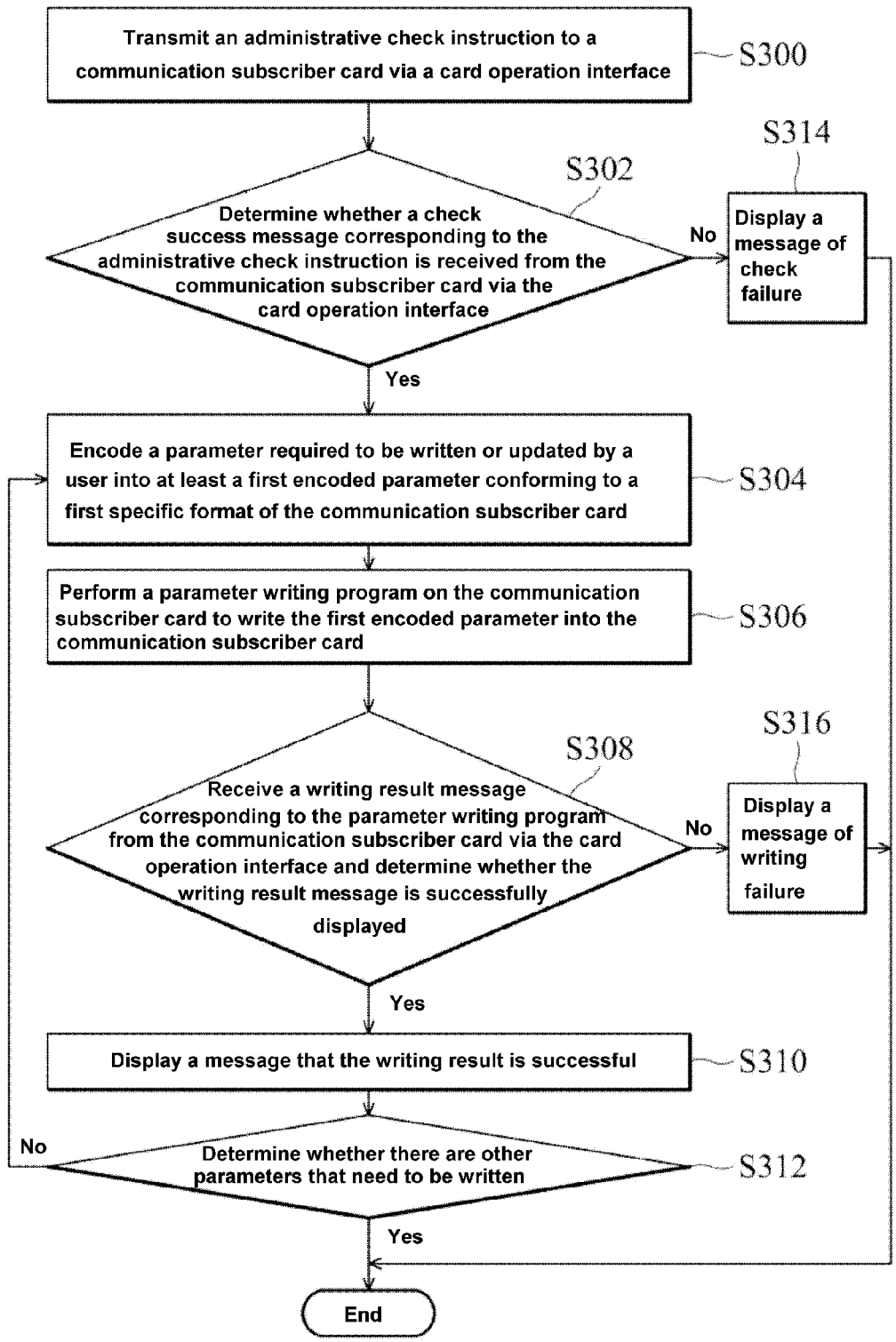
FIG. 3 is a flowchart of a communication subscriber card testing method of one embodiment of the present invention.

FIG. 3 is a flowchart of a communication subscriber card testing method of one embodiment of the present invention. The communication subscriber card testing method is applied to the mobile apparatus 100 of FIG. 1. In this embodiment, a user may directly conduct parameter update and write on a communication subscriber card 200 via the testing software 103 and the card operation interface 104. The flow starts at step S300.

In step S300, the controller 108 transmits an administrative check instruction to a communication subscriber card 200 via a card operation interface 104. In detail, the controller 108 executes the testing program 103 to receive an instruction input by the user via the input apparatus 114. When the testing program 103 receives the requirements input by the user that correspond to writing or updating at least one parameter, the controller 108 transmits an administrative check instruction to the communication subscriber card 200 via the card operation interface 104. It should be noted that the administrative check instruction is an Administrative check instruction (AMD check instruction). The administrative check instruction has one specific segment of instruction codes to provide a check code to perform parameter writing on the communication subscriber card 200 to a developer (tester), so as to prevent an end user from writing. When the communication subscriber card 200 determines that the administrative check instruction is correct, the communication subscriber card 200 will transmit a check success message back to the controller 108. Otherwise, when the communication subscriber card 200 determines that the administrative check instruction is incorrect, the communication subscriber card 200 will transmit a check failure message back to the controller 108.

Then, in step S302, the controller 108 determines whether a check success message corresponding to the administrative check instruction is received from the communication subscriber card 200 via the card operation interface 104. When the controller 108 receives a check success message corresponding to the administrative check instruction from the communication subscriber card 200 via the card operation interface 104, the flow proceeds to step S304; otherwise it proceeds to step S314.

In step S304, the controller 108 encodes a parameter required to be written or updated by a user into at least a first encoded parameter conforming to a first specific format of the communication subscriber card 200.

Then, in step S306, the controller 108 performs a parameter writing program on the communication subscriber card 200 to write the first encoded parameter into the communication subscriber card 200.

Then, in step S308, the controller 108 receives a writing result message corresponding to the parameter writing program from the communication subscriber card 200 via the card operation interface 104 and determines whether the writing result message is successfully displayed. When the writing result message is successfully displayed, the flow proceeds to step S310; otherwise it proceeds to step S316.

In step S310, the controller 108 causes the display apparatus 112 to display a message that the writing result is successful.

Then, in step S312, the controller 108 determines whether there are other parameters that need to be written. When the controller 108 determines that there are other parameters that need to be written, the flow returns to step S304; otherwise, it ends at step S312.

In step S314, the controller 108 causes the display apparatus 112 to display a check failure message. The flow ends at step S314.

In step S316, the controller 108 causes the display apparatus 112 to display a writing failure message. The flow ends at step S316.

Figure 4:
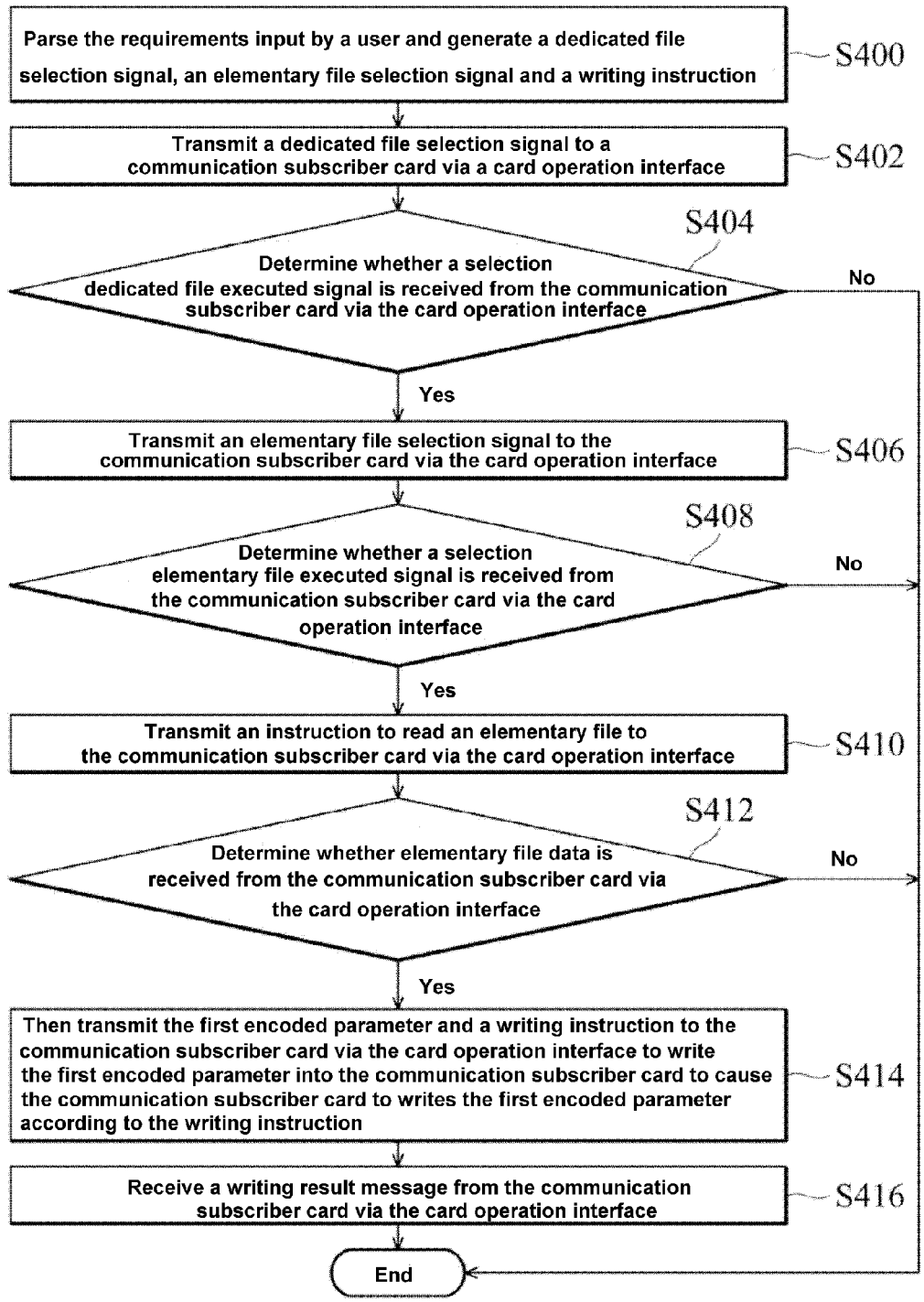
FIG. 4 is a flowchart of a communication subscriber card testing method of another embodiment of the present invention.

FIG. 4 is a flowchart of a communication subscriber card testing method of one embodiment of the present invention. The communication subscriber card testing method is applied to the mobile apparatus 100 of FIG. 1. The communication subscriber card testing method shown in this embodiment is the detail steps of the parameter writing program in FIG. 3. The flow starts at step S400.

In step S400, a controller 108 parses the requirements input by the user and generates a dedicated file selection signal, an elementary file selection signal and a writing instruction.

Then, in step S402, the controller 108 transmits a dedicated file selection signal to a communication subscriber card 200 via a card operation interface 104. It should be noted that at least one dedicated file DF (Dedicated File) and at least one elementary file EF (Elementary File) are included in the communication subscriber card 200. The dedicated file has only one file header, in which management and control information for the entire directory is contained. In other words, the dedicated file is equivalent to the root of a directory. The elementary file has not only a file header, but also a file body, where the file header contains the location and control information for the file, the file body contains real data; throughout the entire communication subscriber card 200, only the elementary file has a file body, and only the elementary file is used to contain data. When the communication subscriber card 200 receives a dedicated file selection signal transmitted by the controller 108, the communication subscriber card 200 may select a specific dedicated file according to an index (address) in the dedicated file selection signal and transmit a selection dedicated file executed signal to the controller 108 via the card operation interface 104 after selecting the dedicated file.

Then, in step S404, the controller 108 determines whether a selection dedicated file executed signal is received from the communication subscriber card 200 via the card operation interface 104 within a given time. When the controller 108 receives a selection dedicated file executed signal from the communication subscriber card 200 via the card operation interface 104, the flow proceeds to step S406. When the controller 108 does not receive a selection dedicated file executed signal from the communication subscriber card 200 via the card operation interface 104 within the given time, the flow ends at step S404.

In step S406, the controller 108 transmits an elementary file selection signal (Elementary File) to the communication subscriber card 200 via the card operation interface 104. When the communication subscriber card 200 receives the elementary file selection signal transmitted by the controller 108, the communication subscriber card 200 will select a specific elementary file according to an index (address) in the elementary file selection signal and transmit a selection elementary file executed signal to the controller 108 via the card operation interface 104 after selecting the elementary file.

Then, in step S408, the controller 108 determines whether a selection elementary file executed signal is received from the communication subscriber card 200 via the card operation interface 104 within a given time. When the controller 108 receives a selection elementary file executed signal from the communication subscriber card 200 via the card operation interface 104, the flow proceeds to step S410. When the controller 108 does not receive a selection elementary file executed signal from the communication subscriber card 200 via the card operation interface 104 within the given time, the flow ends at step S408.

In step S410, the controller 108 transmits an instruction to read an elementary file to the communication subscriber card 200 via the card operation interface 104 to receive elementary file data from the communication subscriber card 200.

Then, in step S412, the controller 108 determines whether elementary file data is received from the communication subscriber card 200 via the card operation interface 104 within a given time. When the communication subscriber card 200 receives an instruction to read an elementary file via the card operation interface 104, the communication subscriber card 200 transmits the elementary file data corresponding to the selected dedicated file and elementary file to the controller 108 via the card operation interface 104. When the controller 108 receives elementary file data from the communication subscriber card 200 via the card operation interface 104, the flow proceeds to step S414. When the controller 108 does not receive elementary file data from the communication subscriber card 200 via the card operation interface 104 within the given time, the flow ends at step S412.

In step S414, the controller 108 then transmits a first encoded parameter and a writing instruction to the communication subscriber card 200 via the card operation interface 104 to write the first encoded parameter into the communication subscriber card 200 to cause the communication subscriber card 200 to write the first encoded parameter according to the writing instruction.

In step S416, the controller 108 receives a writing result message from the communication subscriber card 200 via the card operation interface 104. In detail, after the communication subscriber card 200 successfully writes the first encoded parameter according to the writing instruction, a writing result message corresponding to writing success is transmitted. Otherwise, when the communication subscriber card 200 cannot write the first encoded parameter successfully according to the writing instruction, a writing result message corresponding to writing failure is transmitted. The flow ends at step S416.

Figure 5:
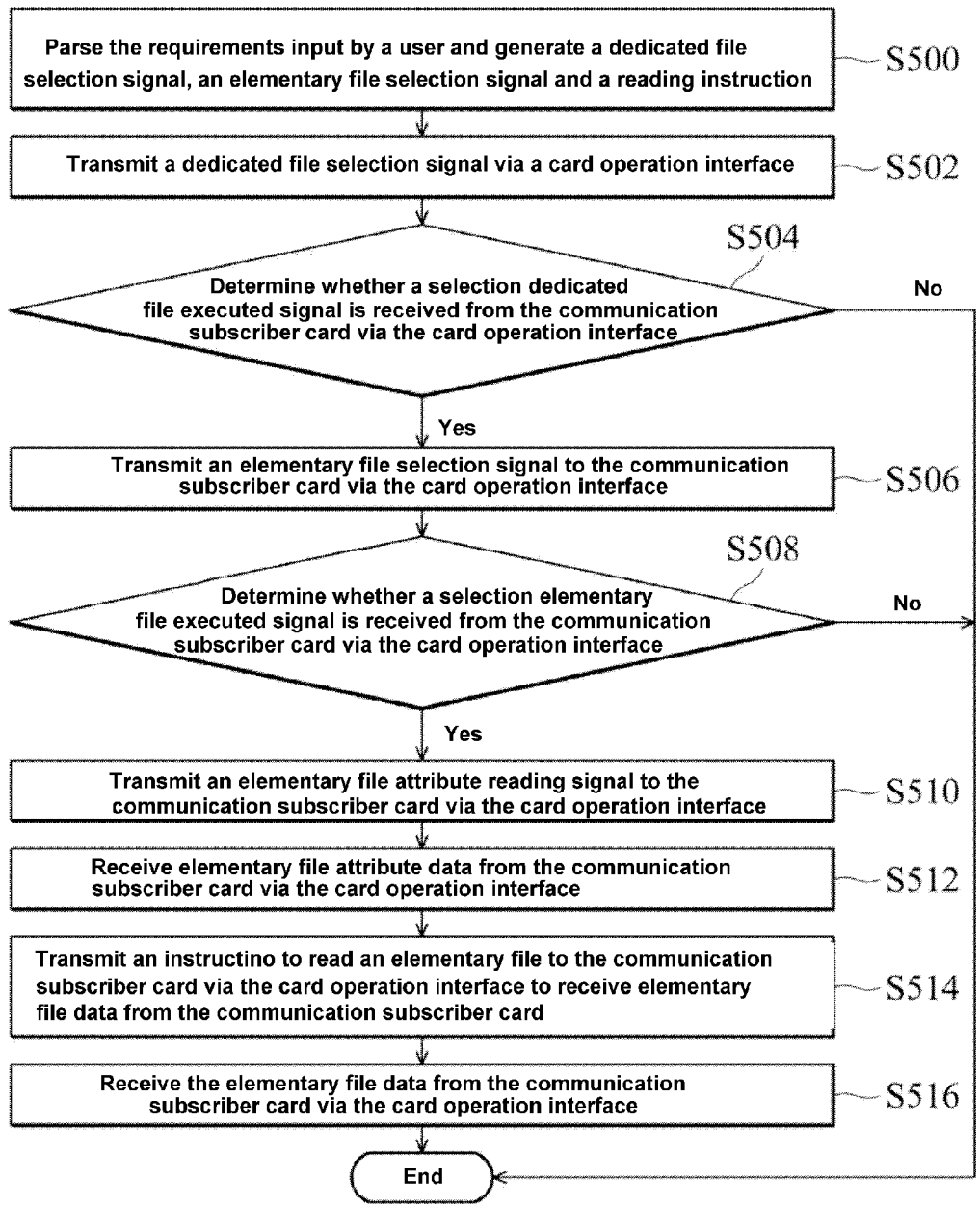
FIG. 5 is a flowchart of a communication subscriber card testing method of another embodiment of the present invention.

FIG. 5 is a flowchart of a communication subscriber card testing method of one embodiment of the present invention. The communication subscriber card testing method is applied to the mobile apparatus 100 of FIG. 1. In this embodiment, a user can directly perform a parameter read on the communication subscriber card 200 via the testing software 103 and the card operation interface 104. In other words, when the testing software 103 receives the requirements input by the user that correspond to reading a parameter in the communication subscriber card 200, the controller 108 can directly execute a parameter reading program. The flow (the parameter reading program) starts at step S500.

In step S500, a controller 108 parses the requirements input by the user and generates a dedicated file selection signal, an elementary file selection signal and a reading instruction.

Then, in step S502, the controller 108 transmits a dedicated file selection signal (Dedicated File) to a communication subscriber card 200 via a card operation interface 104. When the communication subscriber card 200 receives the dedicated file selection signal transmitted by the controller 108, the communication subscriber card 200 will select a specific dedicated file according to an index (address) in the dedicated file selection signal and transmit a selection dedicated file executed signal to the controller 108 via the card operation interface 104 after selecting the dedicated file.

Then, in step S504, the controller 108 determines whether a selection dedicated file executed signal is received from the communication subscriber card 200 via the card operation interface 104 within a given time. When the controller 108 receives a selection dedicated file executed signal from the communication subscriber card 200 via the card operation interface 104, the flow proceeds to step S506. When the controller 108 does not receive a selection dedicated file executed signal from the communication subscriber card 200 via the card operation interface 104 within the given time, the flow ends at step S504.

In step S506, the controller 108 transmits an elementary file selection signal (Elementary File) to the communication subscriber card 200 via the card operation interface 104. When the communication subscriber card 200 receives the elementary file selection signal transmitted by the controller 108, the communication subscriber card 200 will select a specific elementary file according to an index (address) in the elementary file selection signal and transmit a selection elementary file executed signal to the controller 108 via the card operation interface 104 after selecting the elementary file.

Then, in step S508, the controller 108 determines whether a selection elementary file executed signal is received from the communication subscriber card 200 via the card operation interface 104 within a given time. When the controller 108 receives a selection elementary file executed signal from the communication subscriber card 200 via the card operation interface 104, the flow proceeds to step S510. When the controller 108 does not receive a selection elementary file executed signal from the communication subscriber card 200 via the card operation interface 104 within the given time, the flow ends at step S508.

In step S510, the controller 108 transmits an elementary file attribute reading signal to the communication subscriber card 200 via the card operation interface 104. When the communication subscriber card 200 receives the elementary file attribute reading signal transmitted by the controller 108, the communication subscriber card 200 transmits the elementary file attribute data back to the controller 108, wherein the elementary file attribute may comprise information such as the type and length, etc. of the elementary file.

In step S512, the controller 108 receives elementary file attribute data from the communication subscriber card 200 via the card operation interface 104.

Then, in step S514, the controller 108 transmits an instruction to read an elementary file to the communication subscriber card 200 via the card operation interface 104 to receive elementary file data from the communication subscriber card 200. When the communication subscriber card 200 receives the instruction to read an elementary file via the card operation interface 104, the communication subscriber card 200 transmits the elementary file data corresponding to the selected dedicated file and elementary file to the controller 108 via the card operation interface 104.

Then, in step S516, the controller 108 receives elementary file data from the communication subscriber card 200 via the card operation interface 104. The flow ends at step S516.

Figure 6A:
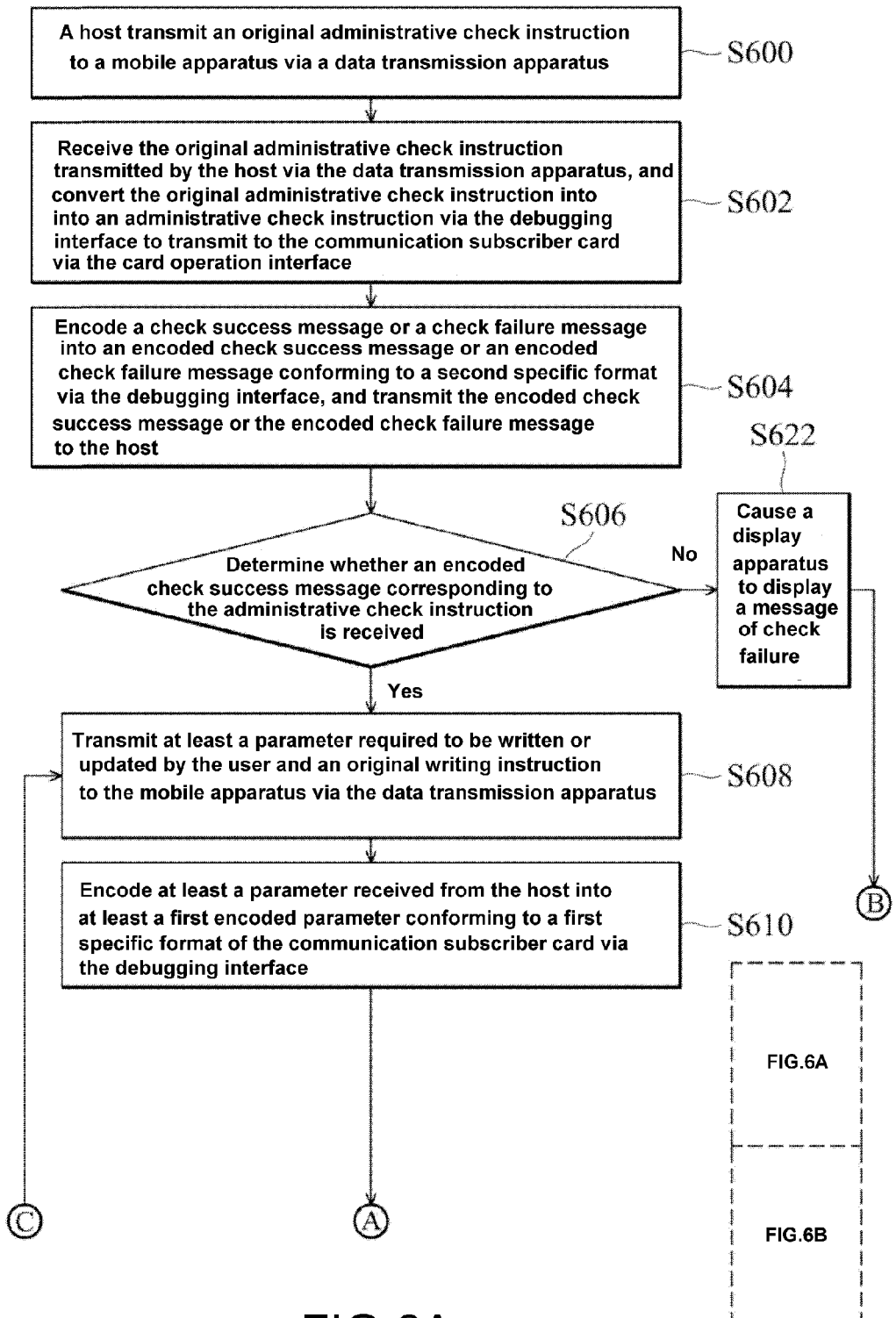
FIG. 6A to FIG. 6B are flowcharts of a communication subscriber card testing method of another of the present invention.
Figure 6B:
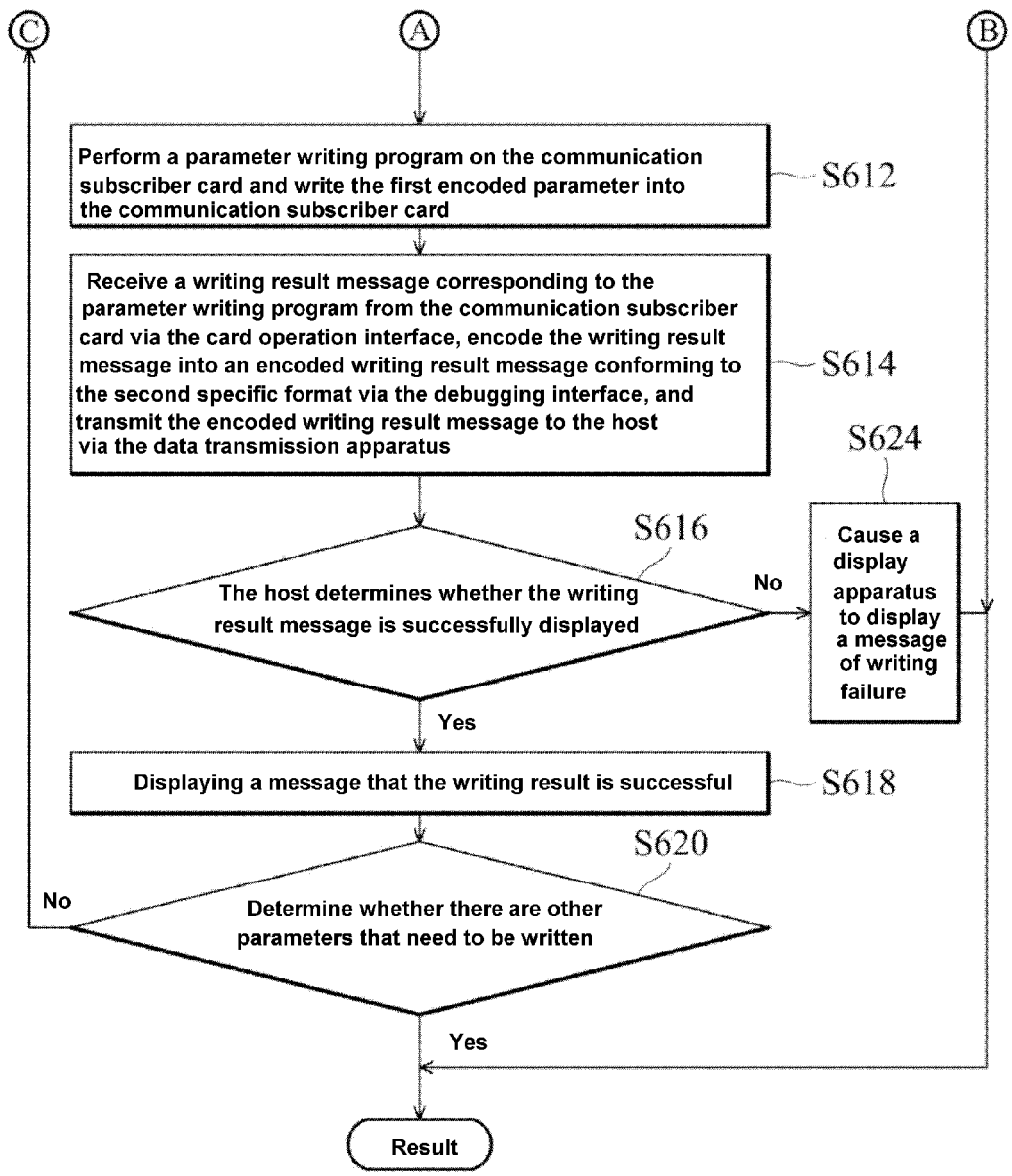

FIG. 6A-FIG. 6B are a communication subscriber card testing method of one embodiment of the present invention. The communication subscriber card testing method is applied to the communication subscriber card testing apparatus 1000 of FIG. 2. In this embodiment, a user can operate the mobile apparatus 100 via the host 300, and perform data write and update on a communication subscriber card 200 via the card operation interface 104 and the debugging interface 106 of the mobile apparatus 100. The flow starts at step S600.

In step S600, a host 300 transmits an original administrative check instruction to a mobile apparatus 100 via a data transmission apparatus 304. In detail, the user may generate an original administrative check instruction through an interface provided by the host 300 by receiving an instruction input by the user via the input apparatus 310, and transmit the original administrative check instruction to the mobile apparatus 100 via the data transmission apparatus 304.

Then, in step S602, the controller 108 of the mobile apparatus 100 receives the original administrative check instruction transmitted by the host 300 via the data transmission apparatus 116, and converts the original administrative check instruction into an administrative check instruction via the debugging interface 106 to transmit the same to the communication subscriber card 200 via the card operation interface 104. It should be noted that the administrative check instruction is an Administrative check instruction (AMD check instruction). The administrative check instruction has one specific segment of instruction codes to provide a check code to perform parameter writing on the communication subscriber card 200 to a developer (tester), so as to prevent an end user from writing. When the communication subscriber card 200 determines that the administrative check instruction is correct, the communication subscriber card 200 will transmit a check success message back to the controller 108 via the card operation interface 104. Otherwise, when the communication subscriber card 200 determines that the original administrative check instruction is incorrect, the communication subscriber card 200 will transmit a check failure message back to the controller 108.

Then, in step S604, the controller 108 encodes the check success message or the check failure message into an encoded check success message or an encoded check failure message conforming to a second specific format via the debugging interface 106 and transmits the encoded check success message or the encoded check success message to the host 300, wherein the second specific format conforms to an ETS specification.

Then, in step S606, the host 300 determines whether an encoded check success message corresponding to the administrative check instruction is received. When the host 300 receives an encoded check success message corresponding to the administrative check instruction from the data transmission apparatus 304, the flow proceeds to step S608; otherwise it proceeds to step S622.

In step S608, the controller 302 transmits at least a parameter required to be written or updated by the user and an original writing instruction to the mobile apparatus 100 via the data transmission apparatus 304 so as to cause the mobile apparatus 100 to start a parameter writing program.

Then, in step S610, the controller 108 encodes at least a parameter received from the host 300 into at least a first encoded parameter conforming to a first specific format of the communication subscriber card 200 via the debugging interface 106.

Then, in step S612, the controller 108 performs a parameter writing program on the communication subscriber card 200 and writes the first encoded parameter into the communication subscriber card 200.

Then, in step S614, the controller 108 receives a writing result message corresponding to the parameter writing program from the communication subscriber card 200 via the card operation interface 104, encodes the writing result message into an encoded writing result message conforming to the second specific format via the debugging interface 106 and transmits the encoded writing result message to the host 300 via the data transmission apparatus 116.

Then, in step S616, the controller 302 of the host 300 determines whether the writing result message is successfully displayed. When the writing result message is successfully displayed, the flow proceeds to step S618; otherwise it proceeds to step S624.

In step S618, the controller 302 causes the display apparatus 308 to display a message that the writing result is successful.

Then, in step S620, the controller 302 determines whether there are other parameters that need to be written. When the controller 302 determines that there are other parameters that need to be written, the flow returns to step S608; otherwise, it ends at step S620.

In step S622, the controller 302 causes the display apparatus 308 to display a check failure message. The flow ends at step S622.

In step S624, the controller 302 causes the display apparatus 308 to display a writing failure message. The flow ends at step S624.

Figure 7:
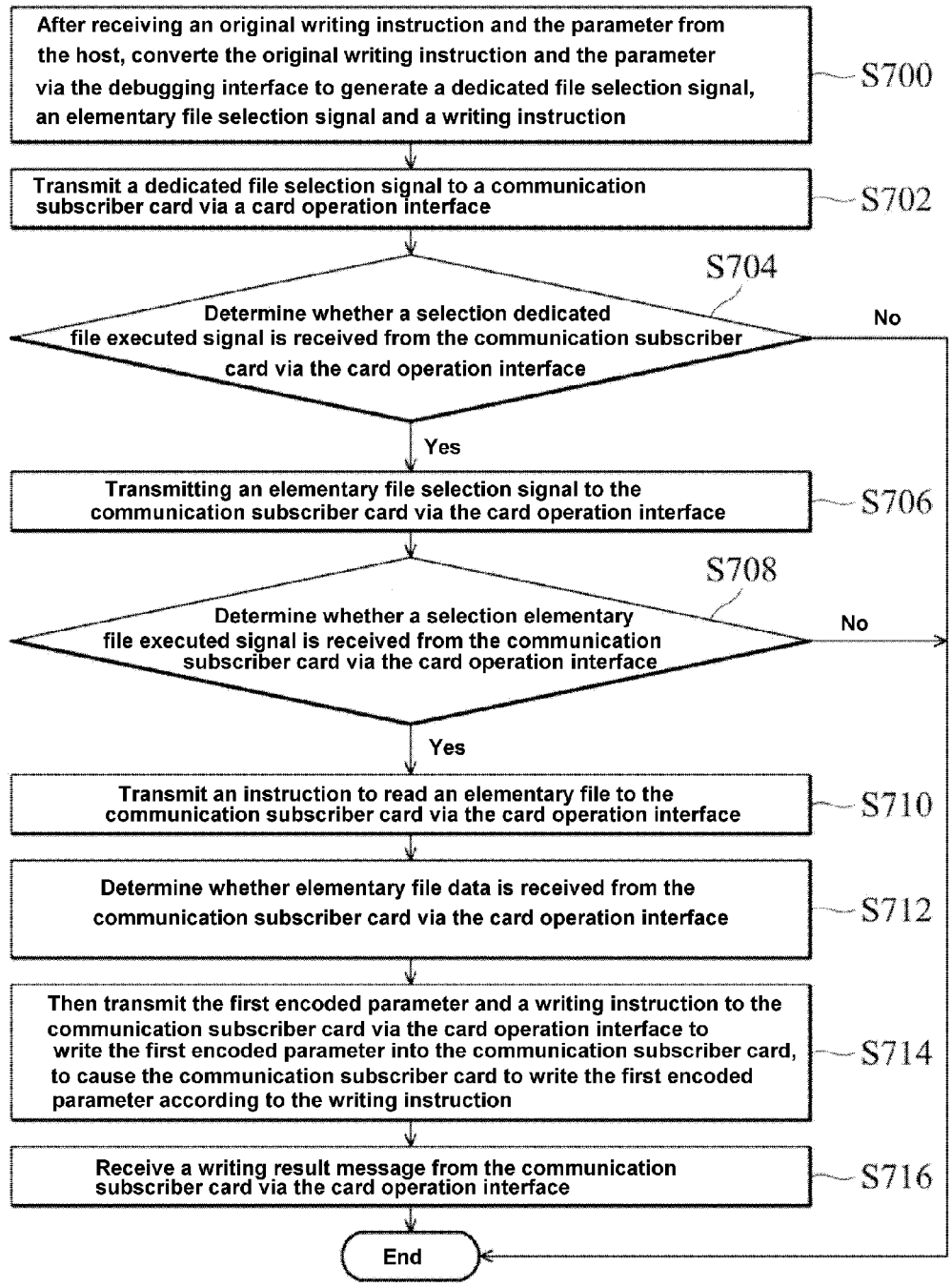
FIG. 7 is a flowchart of a communication subscriber card testing method of another embodiment of the present invention.

FIG. 7 is a flowchart of a communication subscriber card testing method of one embodiment of the present invention. The communication subscriber card testing method is applied to the communication subscriber card testing apparatus 1000 of FIG. 2. The communication subscriber card testing method shown in this embodiment is the detail steps of the parameter writing program of FIG. 6A and FIG. 6B. The flow starts at step S700. It should be noted that steps S702 to S716 of the present flow are similar to steps S402 to S416 as shown in FIG. 4. Therefore, please refer to the description of FIG. 4 for the description of steps S702 to S716, which will not be described again here.

In step S700, after receiving an original writing instruction and a parameter from a host 100, a controller 108 of a mobile apparatus 100 analyses (converts) the original writing instruction and the parameter via the debugging interface 106 to generate a dedicated file selection signal, an elementary file selection signal and a writing instruction. Then, in step S702, the controller 108 transmits a dedicated file selection signal (Dedicated File) to the communication subscriber card 200 via the card operation interface 104. It should be noted that at least one dedicated file DF (Dedicated File) and at least one elementary file EF (Elementary File) are included in the communication subscriber card 200. The dedicated file has only one file header, in which management and control information for the entire directory is contained. In other words, the dedicated file is equivalent to the root of a directory. The elementary file has not only a file header, but also a file body, where the file header contains the location and control information for the file, the file body contains real data; throughout the entire communication subscriber card 200, only the elementary file has a file body, and only the elementary file is used to contain data.

Figure 8:
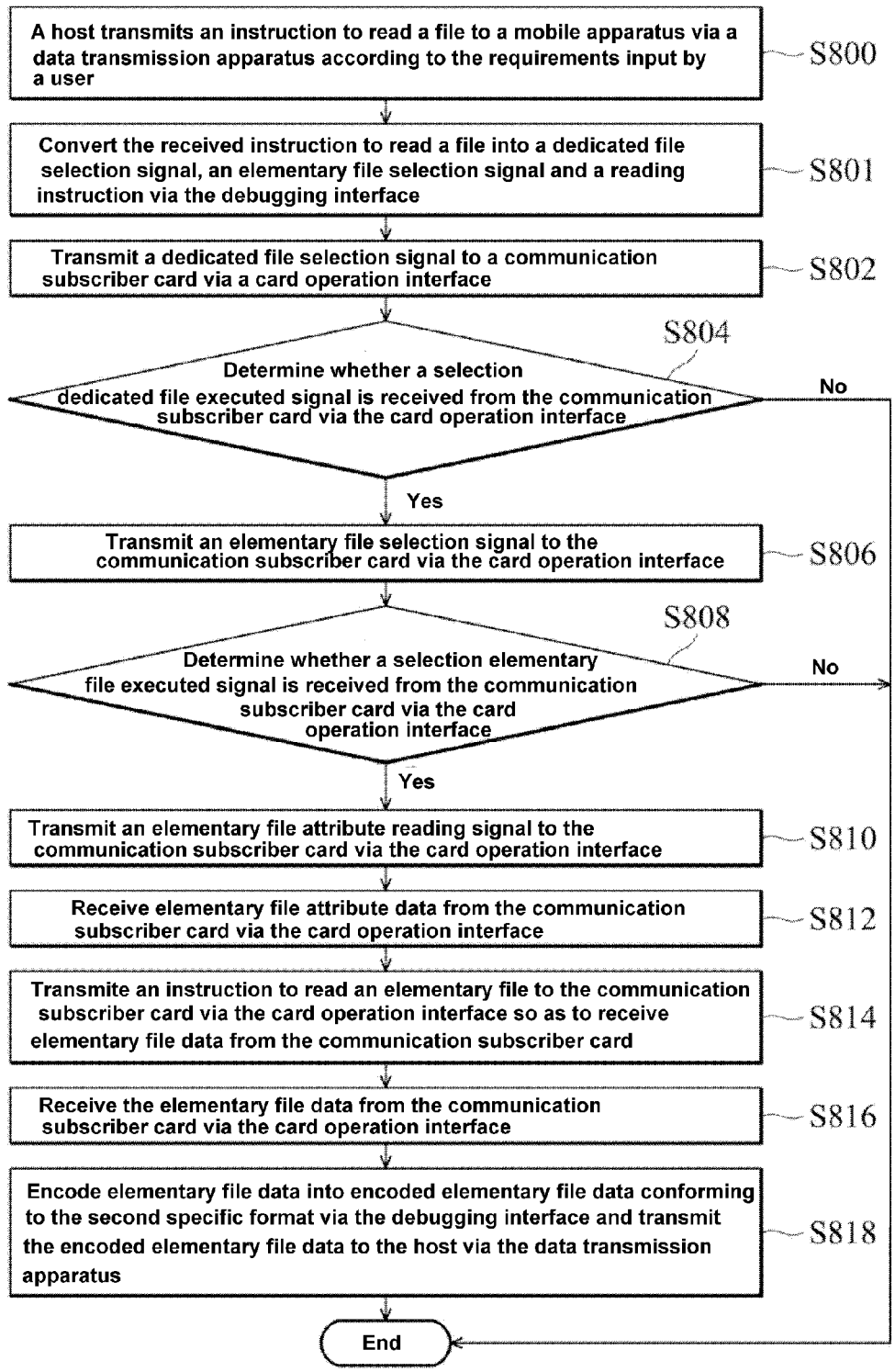
FIG. 8 is a flowchart of a communication subscriber card testing method of another embodiment of the present invention.

FIG. 8 is a flowchart of a communication subscriber card testing method of one embodiment of the present invention. The communication subscriber card testing method is applied to the communication subscriber card testing apparatus 1000 of FIG. 2. In this embodiment, a user can operate the mobile apparatus 100 via the host 300, and perform data read on a communication subscriber card 200 via the card operation interface 104 and the debugging interface 106 of the mobile apparatus 100. The flow starts at step S800. It should be noted that steps S802 to S816 of the present embodiment are similar to steps S502 to S516 as shown in FIG. 5. Therefore, please refer to steps S502 to S516 of FIG. 5 for the description of S802 to S806, which will not be described again here.

In step S800, a host 300 transmits an instruction to read a file instruction to a mobile apparatus 100 via a data transmission apparatus 304 according to the requirements input by a user. In detail, when the host 300 receives the requirements input by the user that correspond to reading a parameter in the communication subscriber card 200, the host 300 transmits the instruction to read a file to the mobile apparatus 100 via the data transmission apparatus 304 according to the requirements input by the user.

Then, in step S801, the controller 108 converts the received instruction to read a file into a dedicated file selection signal, an elementary file selection signal and a reading instruction via a debugging interface 106.

In step S818, the controller 108 encodes elementary file data into encoded elementary file data conforming to a second specific format via the debugging interface 106 and transmits the encoded elementary file data to the host 300 via a data transmission apparatus 116. The flow ends at step S818.

As stated above, the mobile apparatus of the present invention may directly read and write a testing parameter in a communication subscriber card so as to reduce the inconveniences for testers and developers and can immediately test problems occurring to the mobile apparatus.

The method, or a specific form or a portion thereof of the present invention can exist in the form of program codes. The program codes can be stored in a physical medium, such as a floppy disk, an optical disk, a hard disk or any other machine-readable (e.g. computer readable) storage medium, or a computer program product of which the form of appearance is not limited, wherein when the program codes are loaded and executed by a machine such as a computer, the machine becomes an apparatus to participate in the present invention. The program codes may also be transmitted through some transmission medium, such as an electric wire, a cable, an optical fibre or in any transmission form, wherein when the program codes are loaded and executed by a machine such as a computer, the machine becomes an apparatus to participate in the present invention. When practiced in a general-purpose processing unit, the program codes together with the processing unit provide a unique apparatus the operations of which are similar to those of an application-specific logic circuit.

However, what specified above are only preferred embodiments of the present invention and are not intended to limit the implementation scope of the present invention, namely any simple and equivalent changes and modifications which are made in accordance with the claims of the present invention and the description contents of the present invention also fall within the scope defined by the present patent invention. Moreover, any one of the embodiments or the claims of the present invention does not need to achieve all the purposes or advantages or characteristics disclosed in the present invention. Furthermore, the sections of abstract and the title are only for assisting in searching patent documents, but not for limiting the scope of rights of the present invention.

The invention claimed is:

1. A mobile apparatus, comprising:
a communication subscriber card port apparatus to be connected to a communication subscriber card; and
a controller to transmit an administrative check instruction to the communication subscriber card via a card operation interface and encode at least a parameter into at least a first encoded parameter conforming to a first specific format of the communication subscriber card after the controller receives a check success message from the communication subscriber card via the card operation interface, so as to perform a parameter writing program on the communication subscriber card and write the first encoded parameter into the communication subscriber card,
wherein the controller is further used to receive an original administrative check instruction from a host and convert the original administrative check instruction into the administrative check instruction via a debugging interface to transmit the administrative check instruction to the communication subscriber card via the card operation interface.

2. The mobile apparatus of claim 1, wherein the parameter is a parameter that needs to be updated for testing the communication subscriber card, and the first specific format is hexadecimal.

3. The mobile apparatus of claim 1, wherein in the parameter writing program, the controller transmits a dedicated file selection signal to the communication subscriber card via the card operation interface; the controller transmits an elementary file selection signal to the communication subscriber card via the card operation interface when receiving a selection dedicated file executed signal from the communication subscriber card via the card operation interface; the controller transmits an instruction to read an elementary file to the communication subscriber card via the card operation interface when the controller receives a selection elementary file executed signal from the communication subscriber card via the card operation interface to receive elementary file data from the communication subscriber card; the controller then transmits the first encoded parameter and a writing instruction to the communication subscriber card via the card operation interface when the controller receives the elementary file from the communication subscriber card via the card operation interface to write the first encoded parameter into the communication subscriber card.

4. The mobile apparatus of claim 1, further comprising a display apparatus, wherein when the controller receives a writing result message corresponding to the parameter writing program from the communication subscriber card via the card operation interface, the controller causes the display apparatus to display the writing result message.

5. The mobile apparatus of claim 1, wherein after the controller receives the check success message from the communication subscriber card via the card operation interface, the controller is further used to encode the check success message into an encoded check success message conforming to a second specific format via the debugging interface and transmit the encoded check success message to the host.

6. The mobile apparatus of claim 5, wherein the controller converts an original writing instruction into the dedicated file selection signal, the elementary file selection signal and the writing instruction via the debugging interface when the controller receives the original writing instruction and the parameter from the host.

7. The mobile apparatus of claim 5, wherein when the controller receives the writing result message corresponding to the parameter writing program from the communication subscriber card via the card operation interface, the controller converts the writing result message into an encoded writing result message conforming to the second specific format via the debugging interface so as to transmit the encoded writing result message to the host.

8. A communication subscriber card testing method, applied to a mobile apparatus connected to a communication subscriber card, the method comprising:
transmitting an administrative check instruction to the communication subscriber card via a card operation interface of the mobile apparatus;
encoding at least a parameter into at least a first encoded parameter conforming to a first specific format of the communication subscriber card after receiving a check success message from the communication subscriber card via the card operation interface;
performing a parameter writing program on the communication subscriber card to write the first encoded parameter into the communication subscriber card;
receiving an original administrative check instruction from a host; and
converting the original administrative check instruction into the administrative check instruction via a debugging interface so as to transmit the administrative check instruction to the communication subscriber card via the car operation interface.

9. The communication subscriber card testing method of claim 8, wherein the parameter is a parameter that needs to be updated for testing the communication subscriber card, and the first specific format is hexadecimal.

10. The communication subscriber card testing method of claim 8, wherein the parameter writing program further comprises:
transmitting a dedicated file selection signal to the communication subscriber card via the card operation interface;
transmitting an elementary file selection signal to the communication subscriber card via the card operation interface when receiving a selection dedicated file executed signal from the communication subscriber card via the card operation interface;
transmitting an instruction to read an elementary file to the communication subscriber card via the card operation interface when receiving the selection elementary file executed signal from the communication subscriber card via the card operation interface so as to receive elementary file data from the communication subscriber card; and
transmitting the first encoded parameter and a writing instruction to the communication subscriber card via the card operation interface when receiving the elementary file from the communication subscriber card via the card operation interface so as to write the first encoded parameter into the communication subscriber card.

11. The communication subscriber card testing method of claim 9, further comprising: when receiving a writing result message corresponding to the parameter writing program from the communication subscriber card via the card operation interface, causing the display apparatus to display the writing result message.

12. The communication subscriber card testing method of claim 8, further comprising:
- encoding a check success message into an encoded check success message conforming to a second specific format via the debugging interface after receiving the check success message from the communication subscriber card via the card operation interface; and
- transmitting the encoded check success message to the host.

13. The communication subscriber card testing method of claim 12, further comprising:
- converting an original writing instruction into the dedicated file selection signal, the elementary file selection signal and the writing instruction via the debugging interface when receiving the original writing instruction and the parameter from the host.

14. The communication subscriber card testing method of claim 12, further comprising:
- when receiving the writing result message corresponding to the parameter writing program from the communication subscriber card via the card operation interface, converting the writing result message into an encoded writing result message conforming to the second specific format via the debugging interface so as to transmit the encoded writing result message to the host.

\* \* \* \* \*